Aug. 4, 1953     A. B. LANDRY ET AL     2,647,571
STORM WINDOW AND SCREEN FRAME AND ASSEMBLY
Filed Jan. 16, 1948     4 Sheets-Sheet 3
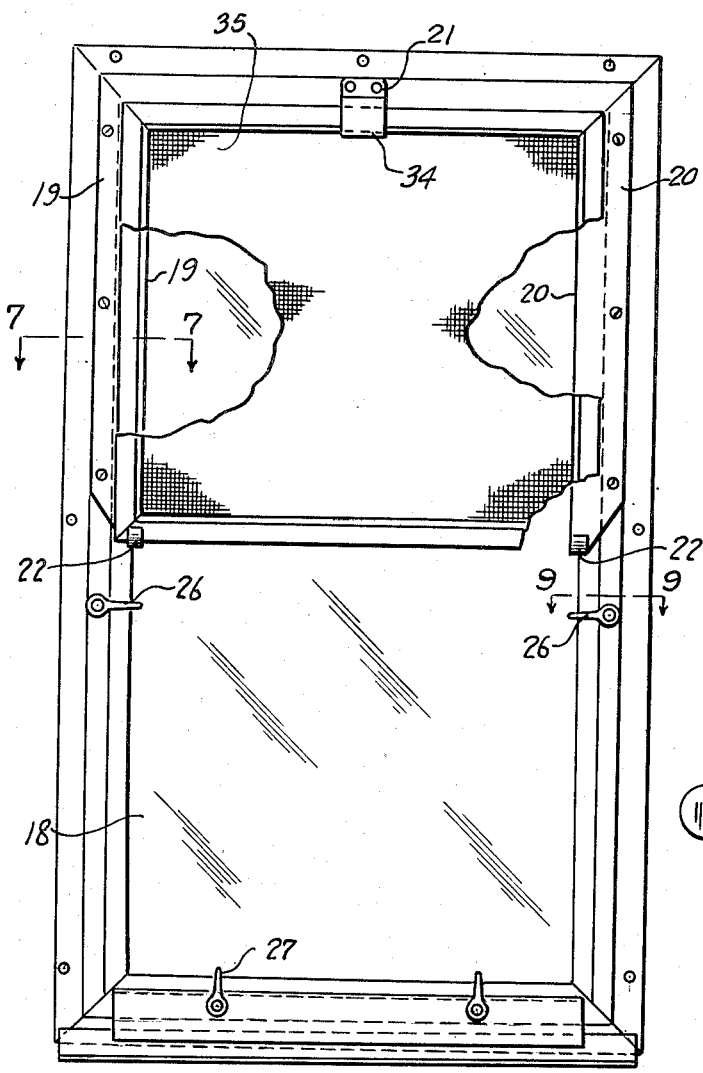
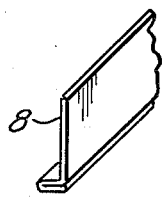
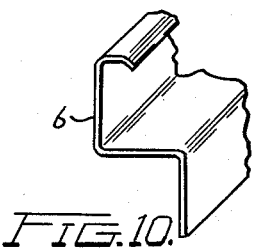
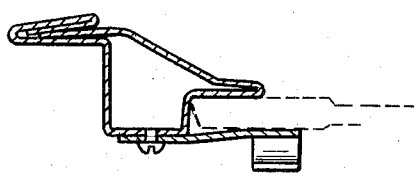
INVENTOR.
Arthur B. Landry
BY W. Homer Martin
ATTORNEYS Aug. 4, 1953 A. B. LANDRY ET AL 2,647,571
STORM WINDOW AND SCREEN FRAME AND ASSEMBLY
Filed Jan. 16, 1948 4 Sheets-Sheet 4

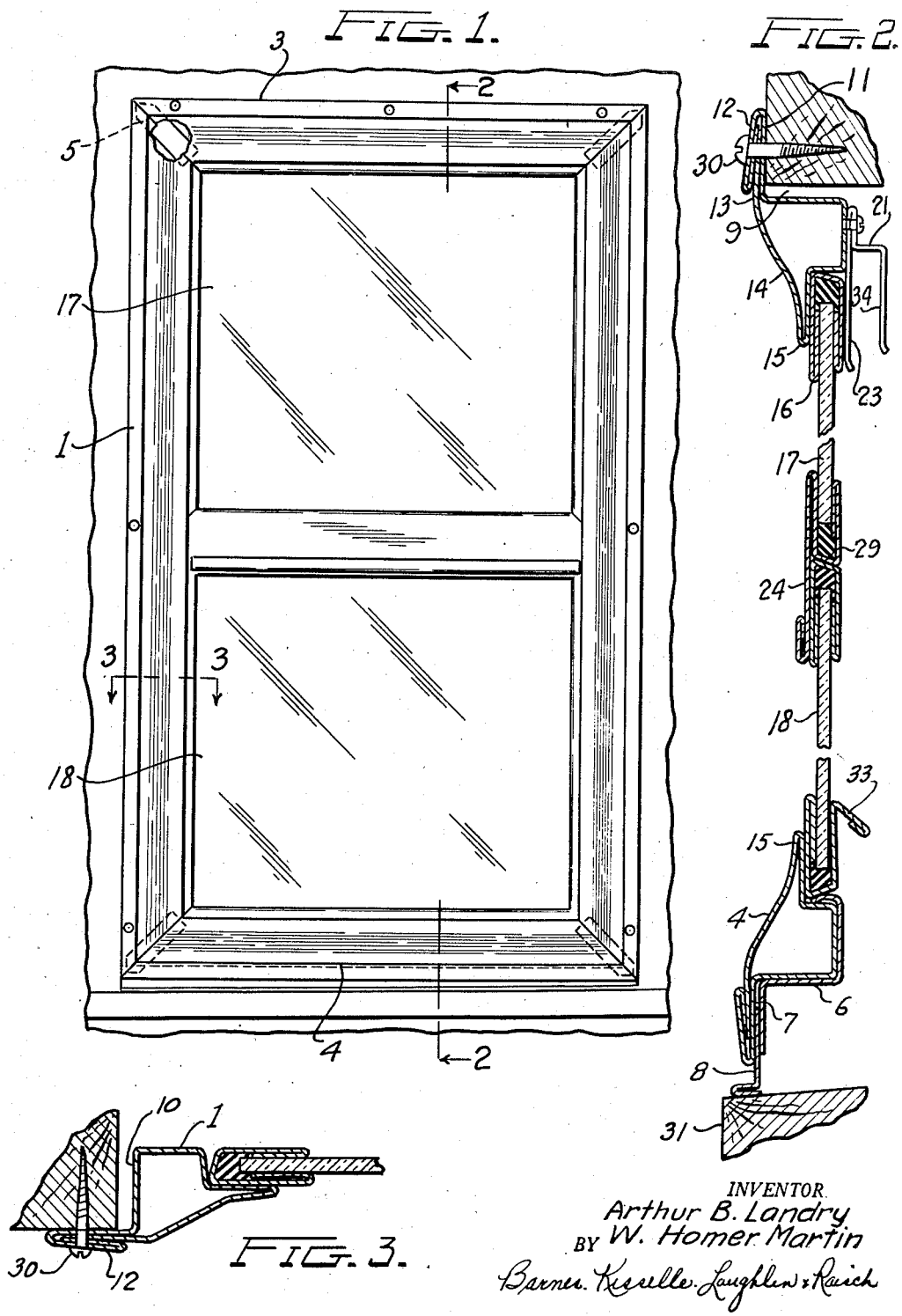

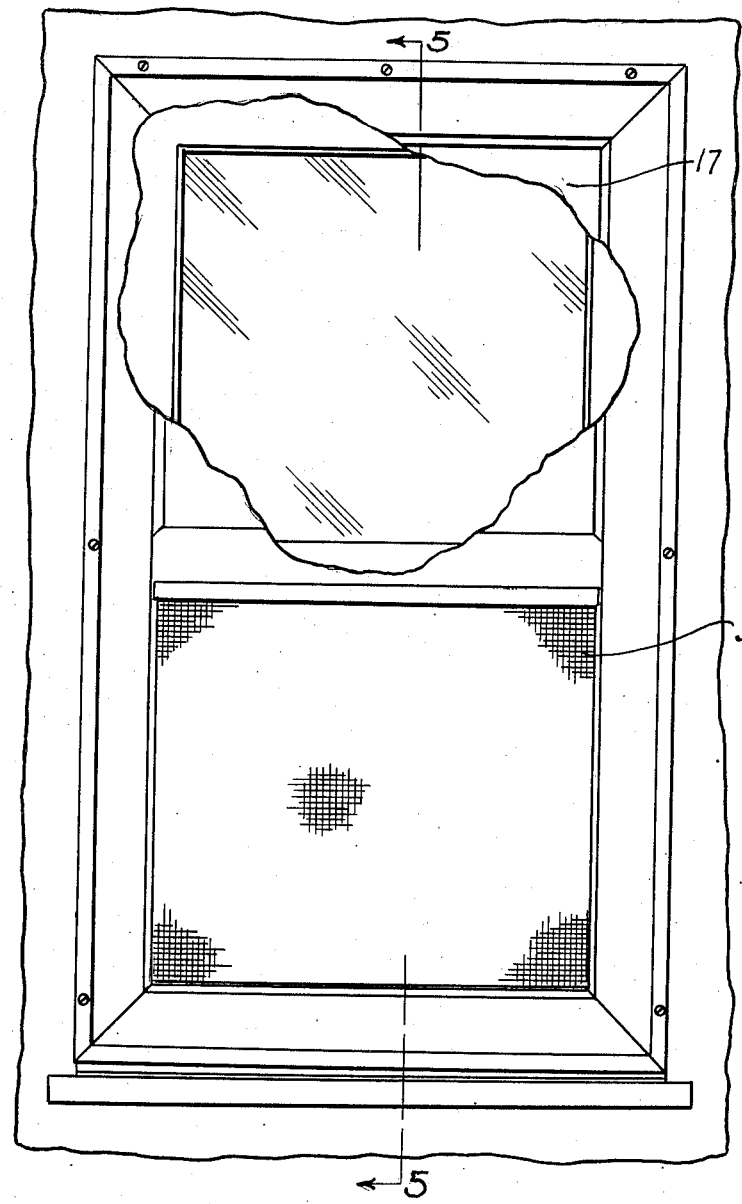
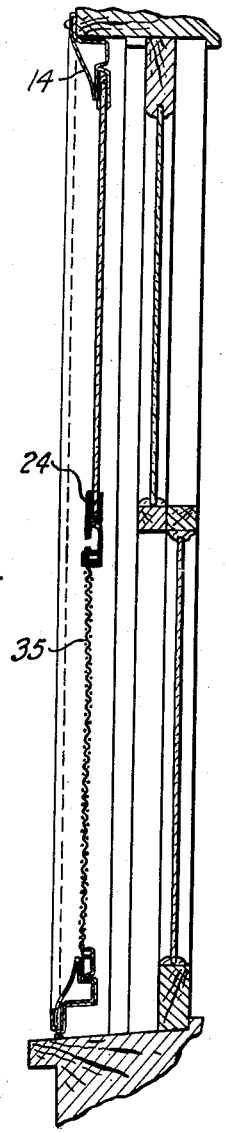

INVENTOR.
Arthur B. Landry
W. Homer Martin
BY
Barnes, Kisselle, Laughlin & Raisch
ATTORNEYS Patented Aug. 4, 1953

2,647,571

UNITED STATES PATENT OFFICE 2,647,571

STORM WINDOW AND SCREEN FRAME AND ASSEMBLY

Arthur B. Landry, Royal Oak, and Warren H. Martin, Plymouth, Mich., assignors to V-Seal Corporation, Royal Oak, Mich., a corporation of Michigan Application January 16, 1948, Serial No. 2,696

3 Claims. (Cl. 160—90)

This invention relates to storm windows. It is the object of the invention to provide a plain but artistic storm window which is both cheap to manufacture and easy to apply to windows that may vary within limits in their dimensions.

Another feature of the invention is that it provides a very good and efficient screen installation for summertime use. At the same time, one of the storm window panels can be stored away in the panel assembly itself. In the wintertime when the screen is not in use this may be stored away in the assembly. Hence, the storm window may be kept permanently in place summer and winter.

Referring to the drawings:

Fig. 1 is an elevation showing the storm window in place over the usual window frame.

Fig. 2 is a section on the line 2—2 of Fig. 1.

Fig. 3 is a section on the line 3—3 of Fig. 1.

Fig. 4 is a view of the same storm window frame with the screen mounted in place of the lower window panel.

Fig. 5 is a section on the line 5—5 of Fig. 4.

Fig. 6 is a view of the inside of the storm window frame showing how the screen can be stored away in the assembly.

Fig. 7 is a section on the line 7—7 of Fig. 6.

Fig. 8 is an enlarged fragmentary perspective of the adapter bar.

Fig. 9 is a section on the line 9—9 of Fig. 6.

Fig. 10 is a fragmentary perspective of the angle bar secured to the bottom rail of the storm window frame.

Figure 11:
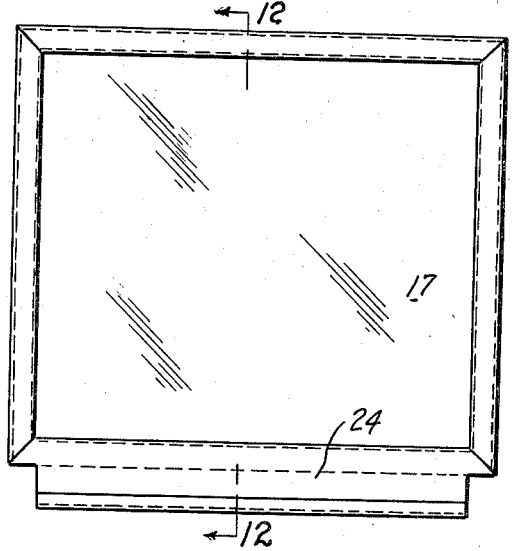
Fig. 11 is an elevation of the upper storm window panel.
Figure 12:
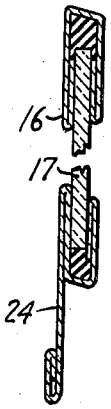
Fig. 12 is a section on the line 12—12 of Fig. 11.
Figure 13:
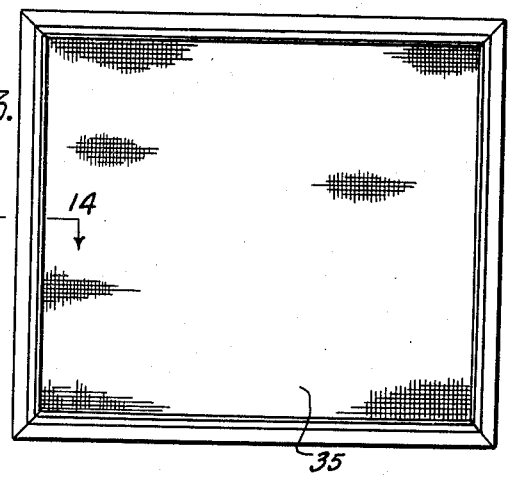
Fig. 13 is an elevation of the window screen panel.
Figure 14:
Fig. 14 is a section on the line 14—14 of Fig. 13.
Figure 15:
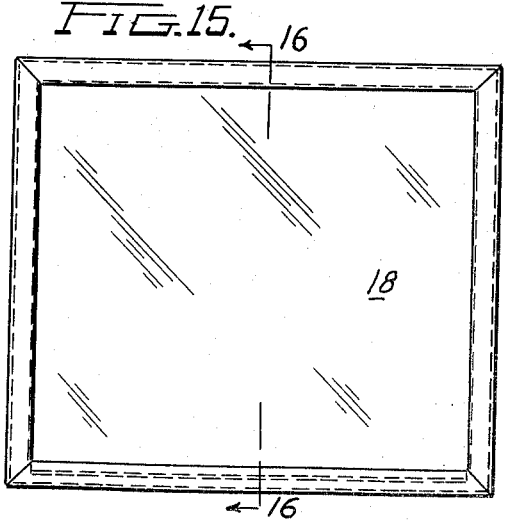
Fig. 15 is an elevation of the lower storm window panel.
Figure 16:
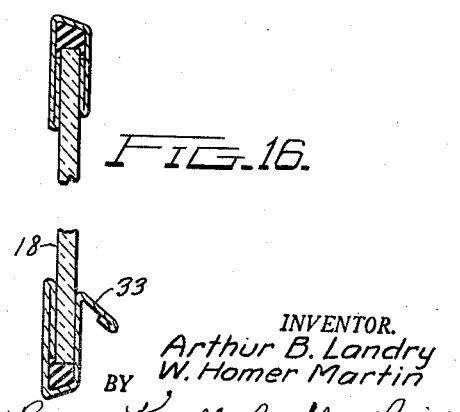
Fig. 16 is a section on the line 16—16 of Fig. 15.

The storm window is made up of a rectangular frame formed by stiles or rails 1 and 2 and upper and lower rails 3 and 4. The rails are mitered together at the corners by means of the connecting pieces 5 that are soldered or welded to the rails to complete the frame. The lower rail 4 has an angle bar 6 shown in perspective in Fig. 10, welded or soldered to the back of the rail. This forms a slot 7 in the flange of the lower rail into which may fit the adapter bar 8 (shown in perspective in Fig. 8).

If Fig. 2 is examined, it will be seen that there is considerable spacing or tolerance 9 between the top rail and the house window frame member. Fig. 3 would show the same tolerance 10 between the stile 1 and the vertical house window frame member. Each of the four rails of the storm window frame has a four ply flange or bead formed by folding over the sheet metal from which the rail is made. It will be seen that the back part of the rail has an outstanding portion 11 which forms the base of the flange and a doubled over portion 12 that folds back on the outstanding portion and forms a slot to receive the edge portion 13 of the outside or face 14 of the rail. These rails on their outside face extend in towards the center of the panel and form a window stop 15 against which lie the sheet metal sash bars 16 of the upper and lower window panels 17 and 18 respectively.

Secured by screws to the inside of the side rails or stiles of the upper frame are panel retaining strips 19 and 20 (see Fig. 6). Secured to the top rail by screws is a yoke-like clip 21. The lower ends of the panel retaining strips are provided with turned up hooks or rests 22. These panel retaining strips are adapted to retain the upper glass panel 17 in place. The upper glass panel can be shoved up on the inside of the glass retaining strips 19 and 20 as shown in Fig. 6, and hooked behind the leg 23 of the clip 21 as shown in Fig. 2. The lower panel 18 engages behind the meeting rail flange 24 of the upper panel (see Fig. 2) and rests behind the window stop 15 of the lower rail of the frame as shown in Fig. 2. Thereupon, the turn buttons 26 on the side rails or stiles may be turned to the position shown in Fig. 6, and the turn buttons 27 may be similarly turned to hold the lower glass panel in place. It will be noticed the meeting rails of the upper and lower panels are beveled as at 29 where they meet to form a fairly air tight joint.

The dimensions of the frame are considerably smaller than the window opening in which it is designed to fit as will be apparent from the tolerances shown at 9 and 10. The outstanding flanges of the frame fit over the outside of the wooden house window frame and conceal these abundant tolerances. These spaces or tolerances are very useful because each storm window does not have to be made to fit into the particular wooden window frame it is designed to occupy. House window frames have usually a certain standard dimension, but when one comes to measure them he will find that these dimensions vary considerably from the intended dimension due to shrinkage, warpage, poor workmanship, rough material, etc. When the ordinary window frame is to be installed in a house window frame it ordinarily has to be tailored for each particular window because of these variations in dimensions. With our storm window frames having the overlapping outside flanges and the large amount of tolerance no measurements have to be taken and no special altering and filling has to be done in order to fit the storm window frame into the wooden window frame. By reason of the tolerances provided and the outstanding flanges the storm window frame can be set into any window of the standard dimensions no matter how much it varies from these standard dimensions by reason of poor workmanship or weathering etc. The storm window frame is simply set into the opening. The flanges lap over the outside of the window frame and are secured to the window frame by the wood screws 30.

We desire to emphasize the plainness and at the same time the artistic merit of our storm window. The rails are preferably constructed of bright aluminum which will not rust or corrode, and has a pleasing and artistic appearance. The folded over flange 12 forms an ornamental bead on the edge of the window frame and the outside face 14 of the rails have a broad but easy slope inward to form the doubled over portion that forms the window panel stop. This makes a rectangular frame which has the simplicity and beauty of a plain picture frame so that the whole storm window assembly is a plain but artistic addition to the exterior of any house or building. Of course, other sheet metal could be used to form the rails for the window frame and the sash bars of the window and the screen panels. Tinned sheet steel, galvanized iron, copper, brass, or chromium plated metal are examples of substitutes.

The sill of the normal house window extends out beyond the upper rail and the stiles and, consequently, I use the adapter strip 8 which fits into the slot 7 in the bottom rail of the storm window frame. This can be pushed in or pulled out of this slot to fill the gap between the flange of the bottom rail and the window sill 31 (see Fig. 2). The lower sash bar of the lower glass panel 18 has a turned out angular flange 33 for handling the window panel when it is desired to take it out. When this panel comes out the upper sash has to be held in order to prevent it from falling as it is only held in place in the retaining strips 19 and 20 by means of the upper metal rail of the lower sash panel 18.

When summer comes and it is desired to put up screens the screen 35, which during the winter may have been stored in the hooks or rests 22 (see Fig. 6) and the outer leg 34 of clip 21 may be taken down and simply slipped in place of the lower glass panel (see Figs. 4 and 5). This makes a very simple and easy way of putting up the screens in the spring and taking them down in the fall and storing them on the spot if desired. When the screen is put in place the lower sash panel can be stored in the rests 22 and behind the clip 21. Of course, the screens and the lower panel can be stored in the closet or garage if this is preferred, but then the occupant of the house has the unpleasant job of hunting them up and determining which panel fits into which window frame etc. The simple arrangement that we have provided for storing them on the inside of the storm window obviates all of this difficulty and trouble.

By this exchange of the screen for the lower storm window panel in the summer and the storm window assembly or frame can become a permanent installation in a house or building. It does not need to be taken down in the spring and reinstalled in the fall. This taking down the storm windows and installing them in the fall is a great chore and usually requires the service of some handy man. Stored storm windows occupy valuable space in the house and in the garage in the summertime. All this is obviated by our combined storm window and window screen assembly.

What we claim is:

1. A combined storm window and screen assembly having in combination, a hollow sheet metal frame of rectangular shape, said frame made of sheet metal folded and doubled upon itself to form on the outer boundary and at the top and sides of the rectangular window frame an overlapping flange, and on the inside boundary of the rectangular frame a window stop flange with an intervening box-like cross section between the two flanges, a panel retaining strip secured on the inside of the frame at each side and along the upper half of the frame to form with the window stop flange, a guide and panel retaining channel, a glass panel including a sash frame with rails slidable in said guide and panel retaining channel to the upper position in the sheet metal frame, a quickly removable glass panel fitted into the lower half of the window frame under the said first-mentioned glass panel when that panel has been slid into place and against the window stop flange thereby supporting the upper panel in the same plane as the lower panel and the lower rail of the upper panel and the upper rail of the lower panel forming meeting rails, movable fastening devices secured to the rectangular frame that can be moved from a position on the said frame to overlap the lower panel to retain the lower panel in position when the same has been set in place in the lower half of the rectangular frame, a clip provided on the inside of the rectangular frame at the top and rests provided at the bottom of the side panel retaining strips, and a window screen panel which can be fitted into the lower half of the window opening when the glass panel is removed, or may be slid into the clip at the top of the frame and supported in the rests for storage, as may also be the lower window panel when taken out and the screen fitted into the lower half of the rectangular window frame.

2. A combined storm window and screen assembly having in combination, a hollow sheet metal frame of rectangular shape, said frame made of sheet metal folded and doubled upon itself to form on the outer boundary and at the top and sides of the rectangular window frame an overlapping flange, and on the inside boundary of the rectangular frame a window stop flange with an intervening box-like cross section between the two flanges, a panel retaining strip secured on the inside of the frame at each side and along the upper half of the frame to form with the window stop flange, a guide and panel retaining channel, a glass panel including a sash frame with rails slidable in said guide and panel retaining channel to the upper position in the sheet metal frame, a quickly removable glass panel fitted into the lower half of the window frame under the said first-mentioned glass panel when that panel has been slid into place and against the window stop flange thereby supporting the upper panel in the same plane as the lower panel and the lower rail of the upper panel and the upper rail of the lower panel forming meeting rails, movable fastening devices secured to the rectangular frame that can be moved from a position on the said frame to overlap the lower panel to retain the lower panel in position when the same has been set in place in the lower half of the rectangular frame, a clip provided on the inside of the retangular frame at the top and rests provided at the bottom of the side panel retaining strips, and a window screen panel which can be fitted into the lower half of the window opening when the glass panel is removed, or may be slid into the clip at the top of the frame and supported in the rests for storage, as may also be the lower window panel when taken out and the screen fitted into the lower half of the rectangular window frame, the rests being turned up lower ends of the panel retaining strips.

3. A convertible storm window and screen frame for permanent location in a window frame, having in combination a frame of sheet metal rails mitered and connected together at the corners of the frame and the side and top rails folded to on the outer boundary of the frame provide window frame overlap flanges which can be fastened to the outside of the window frame and on the inside boundary folded to form panel retaining stop flanges, the bottom rail sheet metal folded to provide on the outside a depending flange and on the inside a window stop flange, each rail forming intervening the inside and outside flanges a hollow box-like structure, retaining strips secured to the side rails along their upper half, a pair of panels having each a frame of sheet metal channels with meeting rails, the panels seated in the same plane when the one is slid into the window retaining channel formed by the side rails and the retaining strips secured thereto, turn buttons secured on the lower half of the storm window frame, the second panel fitting in below the first-mentioned panel and against the window stop flanges and held in place when the turn buttons are turned over the frame of the panel, and a U clip secured on the inside of the top rail of the storm window and screen frame and the lower ends of the retaining strip have curled up metal U's forming rests, and a third panel interchangeable with the lower panel and storable by sliding its upper end in the said U clip and resting its lower end in the two rests at the lower ends of the retaining strips.

ARTHUR B. LANDRY.
WARREN H. MARTIN.

References Cited in the file of this patent

UNITED STATES PATENTS

| Number | Name | Date |
|---|---|---|
| 710,661 | Berger | Oct. 7, 1902 |
| 1,705,132 | Norquist | Mar. 12, 1929 |
| 2,013,824 | Ensminger | Sept. 10, 1935 |
| 2,173,175 | Marquart | Sept. 19, 1939 |
| 2,242,541 | Paul | May 20, 1941 |
| 2,292,273 | Kaufmann | Aug. 4, 1942 |
| 2,321,554 | Milnor | June 8, 1943 |
| 2,402,112 | Gee | June 11, 1946 |
| 2,427,915 | Krantz | Sept. 23, 1947 |
| 2,463,432 | Russell | Mar. 1, 1949 |